April 21, 1942.    A. M. STONER    2,280,270
NUT LOCK
Filed Sept. 2, 1939
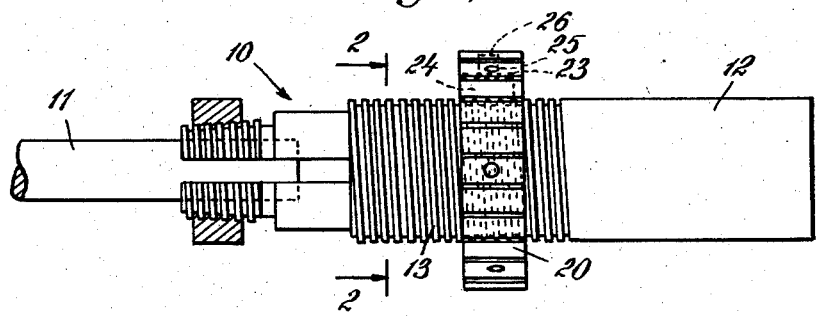
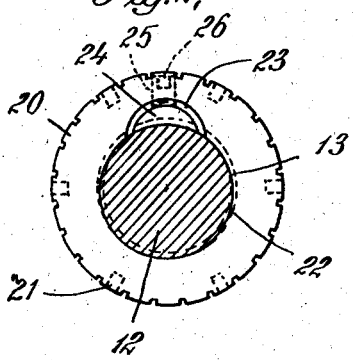
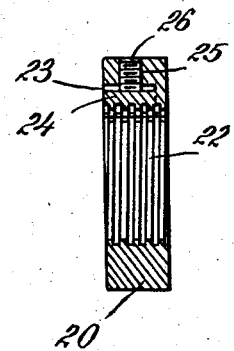
INVENTOR
Arthur M. Stoner
BY
Marshall & Hawley
ATTORNEY Patented Apr. 21, 1942

2,280,270

UNITED STATES PATENT OFFICE 2,280,270

NUT LOCK

Arthur Merrick Stoner, West Hartford, Conn., assignor to The Jacobs Manufacturing Company, Hartford, Conn., a corporation of Connecticut Application September 2, 1939, Serial No. 293,186

3 Claims. (Cl. 151—21)

This invention relates to improvements in nut locks and its object is to provide a simple, inexpensive and efficient arrangement for effectively holding a nut from turning on a threaded body on which it is mounted.

These and other objects of the invention will appear in the following specification in which I will describe a chuck which embodies the invention, the novel features of which will be set forth in the appended claims.

In the drawing:

Figure 1 is a side elevation of a simple form of chuck with a nut thereon which is constructed according to and embodies the present invention;

Figure 2 is a sectional end elevation of the structure shown in Figure 1, the section being taken on the line 2—2 of the latter figure.

Figure 3 is a sectional side elevation of the nut shown in the preceding figures;

10 describes a chuck which is constructed and arranged to hold a tool 11 in one of its ends. Its other end is a shank 12 which is adapted to be inserted in a machine tool. A part 13 of this shank is threaded and supports a nut, the position of which on the shank determines the distance into the machine tool to which the shank can be inserted.

This nut, which is of novel construction, is shown as having a cylindrical periphery 20, by which it may be turned on the shank when it is not locked, which is knurled to facilitate such manipulation and is provided with spaced indentations 21 for spanner wrench engagement. Any desired arrangement for turning the nut may be provided: the latter forms no part of this invention. The bore of the nut is threaded, as at 22, to fit the threads 13.

23 is an arcuate slot cut into the nut from one of its faces and extending part way but not entirely through the nut, leaving a segmental portion 24 integral with the body of the nut. The axis of curvature of the arc is preferably parallel with the axis of the threads 22. 25 is a radially disposed threaded hole which extends from the slot 23 through the periphery of the nut. 26 is a set screw which bears against the segmental portion 24. It has a wrench receiving polygonal opening in its outer end.

When the set screw is backed off of the segmental portion 24 the nut may be turned to a desired position. Then the set screw is screwed in against the segmental portion and the latter forced thereby into tight engagement with the threads 13. This distorts the threads on the segmental portion slightly but sufficiently to lock the nut effectively against turning.

Structural modifications may be made within the spirit and scope of this invention and I intend no limitations other than those imposed by the appended claims.

What I claim is:

1. A lock nut having a body constructed with a threaded cylindrical bore, a transversely curved slot with its axis of curvature parallel with the axis of the bore and with its ends terminating in the inner periphery of the bore cut into the body from one of its faces toward the opposite face to partially separate a minor portion of the threaded part of the body transversely and longitudinally, and a radially disposed set screw in the body arranged to bear against said partially separated portion.

2. A lock nut having a body constructed with a threaded cylindrical bore, a transversely curved slot with its axis of curvature parallel with the axis of the bore and with its ends terminating in the inner periphery of the bore cut into the body from one of its faces toward the opposite face to form a partially separated segmental member, the inner face of which forms a continuation of the threaded bore, and a radially disposed set screw in the body arranged to bear against said partially separated portion for forcing said portion inwardly to distort the alinement of the threads on said member from the threads on the remainder of the bore.

3. In combination with an externally threaded body, a lock nut having a body constructed with a threaded cylindrical bore, adapted to engage the threads on the body, a transversely curved slot with its axis of curvature parallel with the axis of the bore and with its ends terminating in the inner periphery of the bore cut into the body from one of its faces toward the opposite face to form a partially separated segmental member, the inner face of which forms a continuation of the threaded bore, the axis of curvature of said slot being parallel with the axis of the base and the ends of the slot terminating in the inner periphery of said bore, and a radially disposed set screw in the body arranged to bear against said segmental member to distort the threads on said member which engage the threads on said body.

ARTHUR MERRICK STONER.